(12) United States Patent
Yarykin et al.

(10) Patent No.: US 9,009,836 B1
(45) Date of Patent: Apr. 14, 2015

(54) SECURITY ARCHITECTURE FOR VIRTUAL MACHINES

(71) Applicant: Kaspersky Lab ZAO, Moscow (RU)

(72) Inventors: Pavel N. Yarykin, Moscow (RU); Vladislav V. Martynenko, Moscow (RU); Alexey V. Monastyrsky, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 0 days.

(21) Appl. No.: 14/334,393

(22) Filed: Jul. 17, 2014

(51) Int. Cl.
 *G06F 11/00* (2006.01)
 *G06F 21/56* (2013.01)
 *G06F 9/455* (2006.01)

(52) U.S. Cl.
 CPC ............. *G06F 21/56* (2013.01); *G06F 21/568* (2013.01); *G06F 9/45533* (2013.01); *G06F 2009/45587* (2013.01)

(58) Field of Classification Search
 USPC ....................................... 726/22–25; 713/188
 See application file for complete search history.

(56) References Cited

U.S. PATENT DOCUMENTS

| | | | |
|---|---|---|---|
| 6,067,410 A | 5/2000 | Nachenberg | |
| 7,673,341 B2 | 3/2010 | Kramer | |
| 7,934,229 B1 | 4/2011 | Vogel | |
| 8,234,710 B2 | 7/2012 | Wenzinger | |
| 8,387,046 B1 * | 2/2013 | Montague et al. | 718/1 |
| 8,424,093 B2 | 4/2013 | Grachev | |
| 8,479,294 B1 | 7/2013 | Li | |
| 8,584,211 B1 | 11/2013 | Vetter | |
| 8,667,583 B2 | 3/2014 | Polyakov | |
| 8,677,493 B2 | 3/2014 | Singh | |
| 8,863,279 B2 * | 10/2014 | McDougal et al. | 726/22 |
| 2009/0038011 A1 | 2/2009 | Nadathur | |
| 2011/0141124 A1 * | 6/2011 | Halls et al. | 345/522 |
| 2011/0265183 A1 * | 10/2011 | Wu et al. | 726/24 |
| 2011/0321040 A1 | 12/2011 | Sobel | |

(Continued)

FOREIGN PATENT DOCUMENTS

| | | |
|---|---|---|
| WO | WO2011081935 | 7/2011 |
| WO | WO2011143103 | 11/2011 |

OTHER PUBLICATIONS

Burtsev et al., "Fido: Fast Inter-Virtual-Machine Communication for Enterprise Appliances", USENIX. Jun. 2009.

(Continued)

*Primary Examiner* — Nirav B Patel
(74) *Attorney, Agent, or Firm* — Patterson Thuente Pedersen, P.A.

(57) ABSTRACT

Among a plurality of virtual machines running on a host system are a set of virtual machines that provide an operating system, a lightweight agent module, and user applications to be executed. Also, a special-purpose virtual machine executes a central security module. The central security module performs security-related tasks on behalf of individual ones of the other virtual machines, and includes a malware remediation module that generates malware remediation instructions to be executed by the respective virtual machines. The central security module also assesses a capability of a first instruction sequence execution module of a first lightweight agent module to effectively execute the malware remediation instructions, and provides an advanced security task execution component to be installed in a first virtual machine corresponding to the first lightweight agent module, in response to an assessment of capability of the first lightweight agent module being insufficient to execute the malware remediation instructions.

20 Claims, 6 Drawing Sheets

(56) References Cited

U.S. PATENT DOCUMENTS

| | | | |
|---|---|---|---|
| 2012/0144489 A1* | 6/2012 | Jarrett et al. | 726/24 |
| 2013/0055396 A1 | 2/2013 | Wang | |
| 2013/0276113 A1 | 10/2013 | Dalcher | |
| 2013/0291062 A1 | 10/2013 | Bursell | |

OTHER PUBLICATIONS

Gebhardt et al., "Challenges for Inter Virtual Machine Communication", Technical Report RHUL-MA-2010-12. Royal Holloway. Sep. 1, 2010.

* cited by examiner

SECURITY ARCHITECTURE FOR VIRTUAL MACHINES

FIELD OF THE INVENTION

The invention relates generally to information processing systems that implement multiple virtual machines and, more particularly, to an improved security arrangement utilizing a special-purpose virtual machine tasked with providing security services to other virtual machines on a computer system.

BACKGROUND OF THE INVENTION

Systems using virtual machines present their own set of challenges concerning matters of security, such as anti-malware, network protection, and the like. One such challenge relates to the load that security operations place on the physical computing system when each virtual machine runs its own security application. In particular, the duplication of computational loading to run multiple instances of a security application burdens the host machine and adversely affects the system's performance for all applications on all of the virtual machines. For typical environments, many files may be duplicated across multiple virtual machines.

A centralized security application on a specialized virtual machine has been proposed for use with multiple virtual machine systems. This agent-less approach—i.e., without individual security application agents running on each individual virtual machine, provides a substantially more efficient security solution. However, situations arise in which the centralized agent-less security application is unable to carry out certain security-critical operations within the individual virtual machines. One example is cleaning out detected malware and restoring the infected virtual machine to a condition without any deleterious effects of the operation of such malware. The operating system components needed to take certain protective or restorative actions may be insufficient. A practical and effective solution is needed.

SUMMARY OF THE INVENTION

One aspect of the invention is directed to a host machine for executing a plurality of virtual machines. The host machine comprising includes computing hardware having at least one processor and non-transitory data storage media interfaced with the at least one processor and comprising instructions that, when executed by the at least one processor, cause the computing hardware to implement the plurality of virtual machines and a special-purpose virtual machine. Each of the plurality of virtual machines provides an isolated execution environment where an operating system, a lightweight agent module, and user applications are executed. The special-purpose virtual machine provides an isolated execution environment in which a central security module is executed. A hypervisor module coordinates execution of the plurality of virtual machines and the special-purpose virtual machine. Information is communicated between each lightweight agent module and the central security module through the hypervisor module.

The central security module performs security-related tasks on behalf of individual ones of the plurality of virtual machines including malware assessment, and includes a malware remediation module configured to generate particularized malware remediation instructions that define actions to be executed by individual ones of the lightweight agent modules in response to an assessment of malware present in any of the virtual machines corresponding to those lightweight agent modules. The lightweight agent module of each of the virtual machines includes an instruction sequence execution module configured to receive and execute the malware remediation instructions.

The central security module further includes a capability assessment module configured to assess a capability of a first instruction sequence execution module of a first lightweight agent module to effectively execute the malware remediation instructions. Also, a security functionality update module of the central security module is configured to provide an advanced security task execution component to be installed in a first virtual machine corresponding to the first lightweight agent module, in response to an assessment of capability of the first lightweight agent module being insufficient to execute the malware remediation instructions.

A related aspect of the invention is directed to a computer-implemented method for performing anti-malware operations in a computer system such as the host system.

Advantageously, certain aspects of the invention allow the host system to benefit from the use of a centralized special-purpose virtual machine tasked with carrying out security operations on behalf of multiple other virtual machines, while also benefitting from the ability to have the special-purpose virtual machine provide malware treatment and remediation instructions to be carried out by each supported virtual machine, even if any one of these virtual machines initially lacks the functional components needed to carry out such operations. A number of other advantages will become apparent from the following Detailed Description of the Preferred Embodiments.

BRIEF DESCRIPTION OF THE DRAWINGS

The invention may be more completely understood in consideration of the following detailed description of various embodiments of the invention in connection with the accompanying drawings, in which.

Figure 1:
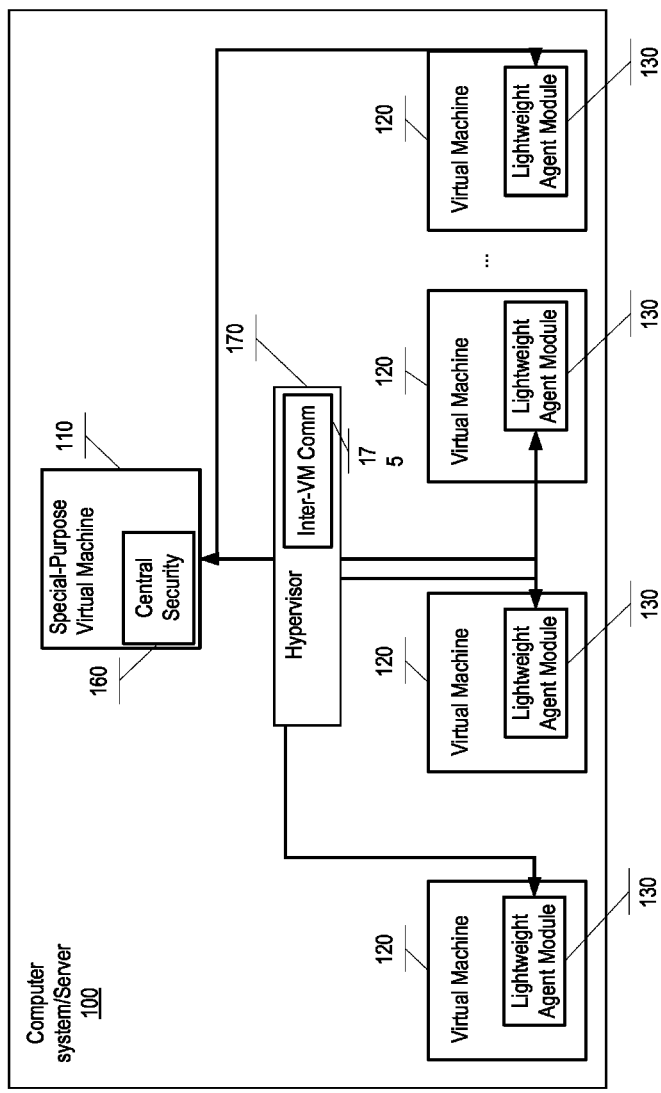
FIG. 1 is a block diagram illustrating an exemplary computer system, such as a server, according to one embodiment, in which certain modules are implemented to carry out aspects of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

I Glossary

The following Glossary sets forth definitions of terms used herein. This Glossary is applicable to only the present Application.

"Advanced security task execution component"—a functional component that facilitates performing one or more advanced security tasks, such as malware remediation of objects that are difficult to access or modify, for instance, system objects, encrypted objects, etc.

"Application-level" object—an object that is prevented from accessing operating system kernel functions and other low-level device drivers and objects, without a particular facility that controls such access, such as, for instance, an application programming interface, operating system driver, etc.

"Central security module"—a module executable on a special-purpose virtual machine and that provides security-related services to other virtual machines executing on the same host machine on which the special-purpose virtual machine executes.

"Data storage media"—One or more electronic hardware devices that stores data in a physical storage medium. Examples include volatile storage (e.g., random-access memory (RAM), whether static or dynamic), non-volatile storage (e.g., electrically-erasable programmable read-only memory, magnetic disk, etc.).

"Functional components"—program code executable to remediating the effects of malware. Examples include libraries, drivers, utilities, and other tools. For instance, such tools can include a file system driver necessary for detecting rootkit malware, a driver for accessing the operating system's registry, a utility for breaking encryption applied by the operation of malware to a file, which must now be cleaned, or a driver for intercepting user input, which is usable for counteracting ransomware. Also, functional components can include backup copies of certain system-level objects of the operating system. Oftentimes, some, or all, of the functional components reside at the system level within the operating system of a virtual machine.

"Guest operating system"—an operating system that is executed within a virtual machine.

"Host machine"—a computer system (i.e., an electronic device or system of inter-operable electronic devices containing hardware including one or more processors, data storage, input-output "devices; and capable of storing and manipulating information according to instructions carried out by the hardware) on which one or more virtual machines are executed. It can be one physical machine, or it can be distributed among multiple physical machines, such as by role or function, or by process thread in the case of a cloud computing distributed model. Examples include desktop or mobile personal computers (PCs), smartphones, and tablets, as well as networking devices, such as routers, switches, and the like. Host machines can be stand-alone devices, or embedded devices that are part of a larger device or system.

"Hypervisor module"—a software layer that presents guest operating systems with a virtual operating platform and manages the execution of the guest operating systems. Multiple instances of a variety of operating systems may share the virtualized hardware resources. Type 1 hypervisors also known as native, or bare metal hypervisors run directly on the host's hardware to control the hardware and to manage guest operating systems. A guest operating-system of each virtual machine thus runs on another level above the hypervisor. Type 2 hypervisors, also referred to as hosted hypervisors, run within a conventional operating-system environment. With the hypervisor layer as a distinct second software level, guest operating-systems run at the third level above the hardware.

"Isolated execution environment"—A set of one or more processes and associated data storage, which are inaccessible to other processes executed on the same host machine, except for a hypervisor.

"Lightweight agent module"—a module executable on an associated virtual machine, the lightweight agent module including a thin-client module that provides security functionality for the associated virtual machine utilizing security services provided by central security module that is executed by another virtual machine. The lightweight agent module can also include certain security functionality in its own right, but this included security functionality is generally more rudimentary than the more full-featured security functionality of the central security module. The lightweight agent module also includes an instruction sequence execution module that obtains and executes instructions on the associated virtual machine (including security-related instructions obtained from the central security module).

"Malware"—malicious software; any software used to disrupt computer operation, gather sensitive information, or gain access to a computer system in an unauthorized manner. Malware can appear in the form of code, script, active content, and other software. Examples include, viruses, worms, Trojans, ransom-ware, scare-ware, rootkits, bootkits, spyware, etc.

"Malware remediation module"—a module which is part of a central security module, and which generates instructions to be executed on a virtual machine that include clearing detected malware, and remediating the effects of operation of that malware.

"Module"—a real-world device, component, or arrangement of components implemented using hardware, or as a combination of hardware and software, such as by a microprocessor system and a set of program instructions that adapt the module to implement the particular functionality, which (while being executed) transform the microprocessor system into a special-purpose device. A module can also be implemented as a combination of the two, with certain functions facilitated by hardware alone, and other functions facilitated by a combination of software-controlled hardware. In certain implementations, at least a portion, and in some cases, all, of a module can be executed on the processor(s) of one or more computers that execute an operating system, system programs, and application programs, while also implementing the module using multitasking, multithreading, distributed (e.g., cluster, peer-peer, cloud, etc.) processing where appropriate, or other such techniques. In addition, a module can itself be composed of more than one sub-modules, each of which can be regarded as a module in its own right.

"Object"—a process, a piece of software code, or data structure, stored in computer hardware. Examples include files, programs, data packets, etc.

"Operating system," ("OS")—Software executable on computer hardware that handles functions for interaction with network ports and connections, peripherals, scheduling of tasks, allocation of data storage, and presents a default interface to the user when no application program is running Examples include the Windows™ family of operating systems by Microsoft Corporation, Mac OS by Apple Inc., Unix, Linux, iOS, Android, etc.

"Processor"—Electronic hardware part of a computer system that carries out the instructions of a computer program by performing basic arithmetical, logical, temporary storage, and input/output operations of the system. Typically, a processor is implemented as a microprocessor (i.e., integrated on a single chip), though this definition includes processor circuits that are implemented on multiple interconnected integrated circuits. Modern-day processors typically include multiple processing cores and can distribute workload among the multiple processing cores.

"Process virtual machine"—a virtual machine designed to run a single program, which means that it supports a single process. Such virtual machines are usually closely suited to one or more programming languages and built with the purpose of providing program portability and flexibility. Examples include Java Virtual Machine, .Net Framework, Parrot Virtual Machine.

"Quarantine"—An action or condition of rendering, or having rendered, a malware object or merely a suspicious object inoperative without deleting the object outright. A quarantined object can be cataloged, further evaluated, or even restored, in case it is found to be benign.

"Special-purpose virtual machine"—a virtual machine that is executed on a host machine that also executes at least one other virtual machine on which user applications are executed. The special-purpose virtual machine is distinguished from the other virtual machine(s) of that host machine in that the special-purpose virtual machine executes a central security module that provides security-related services to the at least one other virtual machine.

"System-level" object—an object that is accessible by an operating system kernel or other system-level program, but is generally inaccessible by an application program without a special facilitation such as, for example, an application programming interface, operating system driver, etc.

"System virtual machine"—a virtual machine that provides a complete system platform which supports the execution of a complete operating system. These usually emulate an existing architecture, and are built to provide multiple instances of virtual machines, each of which provides an isolated computing environment. This type of architecture is ubiquitous on servers supporting a cloud computing service, Web hosting, and many other services. System virtual machines can run directly on the hardware of the physical computer system known as a host machine, or over an operating system that runs directly on the host machine (known as operating system-level virtualization). Examples include Windows Virtual PC, VMware, Oracle VM, etc.

"Tool"—a program that can be called by other programs to assist with performing one or more specialized operations.

"User applications"—Application programs and associated processes that provide services primarily to the user, rather than to the computer hardware. Examples include Web browsers, word processors, games, media players, etc.

"Virtual machine" is a software-based implementation of a computer system that executes programs like a physical machine using the hardware of a host machine. Virtual machines are separated into two major classifications, based on their use and degree of correspondence to any real machine: system virtual machines, and process virtual machines.

"Means for executing a plurality of virtual machines"—computer hardware including a processor, input/output facilities, and data storage, the processor being programmed by instructions stored in the data storage that, when executed, cause the computer hardware to execute a plurality of virtual machines.

"Means for executing a special-purpose virtual machine"—computer hardware including a processor, input/output facilities, and data storage, the processor being programmed by instructions stored in the data storage that, when executed, cause the computer hardware to execute a special-purpose virtual machine.

"Means for coordinating execution of the a plurality of virtual machines and a special-purpose virtual machine, and for coordinating communications between lightweight agent modules and a central security module"—computer hardware including a processor, input/output facilities, and data storage, the processor being programmed by instructions stored in the data storage that, when executed, cause the computer hardware to execute a hypervisor module.

II Description of Preferred Embodiments

Aspects of the present invention can be implemented as part of a computer system. The computer system can be one physical machine, or can be distributed among multiple physical machines, such as by role or function, or by process thread in the case of a cloud computing distributed model. In various embodiments, aspects of the invention can be configured to run in virtual machines that in turn are executed on one or more physical machines. It will be understood by persons of skill in the art that features of the invention may be realized by a variety of different suitable machine implementations.

FIG. 1 is a block diagram illustrating an exemplary computer system, such as a server, 100 according to one embodiment. Server 100 includes computing hardware, e.g., one or more processors, RAM, non-volatile storage, input/output facilities, network interface circuitry, etc. an example of which is described in greater detail below. Server 100 includes various modules, each of which is constructed, programmed, configured, or otherwise adapted, to carry out a function or set of functions. The term module as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the module to implement the particular functionality, which (while being executed) transform the microprocessor system into a special-purpose device. A module can also be implemented as a combination of the two, with certain functions facilitated by hardware alone, and other functions facilitated by a combination of hardware and software.

Each module can be realized in a variety of suitable configurations, and should generally not be limited to any particular implementation exemplified herein, unless such limitations are expressly called out. In addition, a module can itself be composed of more than one sub-modules, each of which can be regarded as a module in its own right. Moreover, in the embodiments described herein, each of the various modules corresponds to a defined functionality; however, it should be understood that in other contemplated embodiments, each functionality may be distributed to more than one module. Likewise, in other contemplated embodiments, multiple defined functionalities may be implemented by a single module that performs those multiple functions, possibly alongside other functions, or distributed differently among a set of modules than specifically illustrated in the examples herein.

Referring to FIG. 1, server 100 executes a plurality of virtual machines. Two types of virtual machines are executed: special-purpose virtual machine 110, which in turn executes central security module 160; and regular virtual machines 120, each of which executes applications, as well as a lightweight agent module 130. Server 100 also executes a hypervisor module 170 that coordinates execution of the plurality of regular virtual machines 120 and the special-purpose virtual machine 110, as well as coordinating the information exchange of commands and data between these two types of modules.

The coordination of the execution of these virtual machines includes facilitating communication between special-purpose virtual machine 110, and each of regular virtual machines 120, which is provided by inter-VM communication module 175. Module 175 can, in one example embodiment, utilize principles such as those disclosed in Gebhardt, Carl et al., "Challenges for Inter Virtual Machine Communication," Technical Report RHUL-MA-2010-12, Department of Mathematics, Royal Holloway, University of London (2010); and Burtsev, Anton, et al., "Fido: Fast inter-virtual-machine communication for enterprise appliances," Proceedings of the 2009 conference on USENIX Annual technical conference, USENIX Association, (2009), the contents of both being incorporated by reference herein. Other approaches for inter-virtual machine communications are also contemplated according to related embodiments, including approaches that ensure a greater level of mutual trust between the communicating virtual machines. For instance, inter-virtual machine protocols that utilize authentication techniques, encryption, e.g., utilizing public key cryptography, etc., can be employed.

Figure 2:
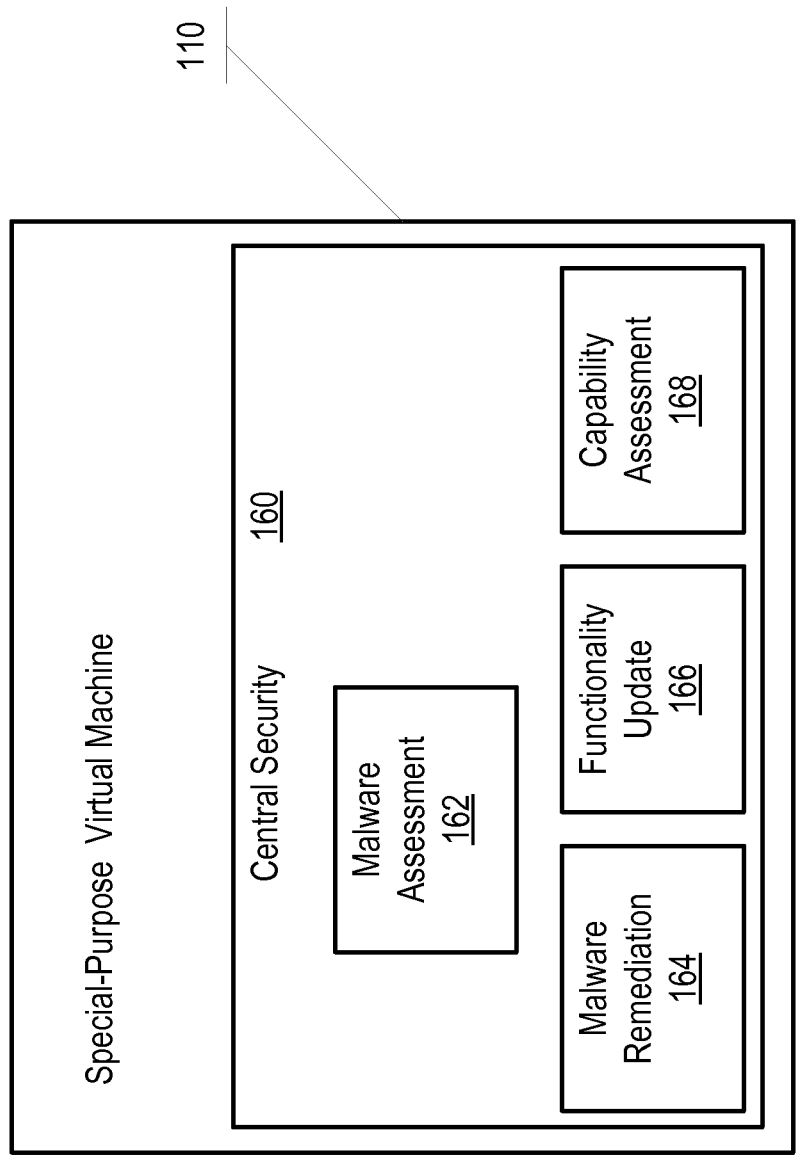
FIG. 2 is a block diagram illustrating a special-purpose virtual machine that executes a central security service operating for the benefit of other virtual machines that execute applications, according to one embodiment.

FIG. 2 is a block diagram illustrating special-purpose virtual machine 110 in greater detail. In particular, central security application 160 includes several modules as depicted according to one embodiment. Malware assessment module 162 provides a malware analysis service applied to objects received by each of lightweight agent modules 130. To this end, malware assessment module 162 utilizes various known anti-virus technologies, such as signature-based detection, as well as heuristic techniques for detecting the presence of malware. Any other suitable anti-malware technology can be utilized within the scope of various aspects of the invention.

In one type of embodiment, malware assessment module 162 initiates a malware assessment operation in response to a service request originated by a given lightweight agent module 130. The service request is communicated through inter-virtual machine communication module 175 of hypervisor module 170. In one related embodiment, the request includes a copy of the object in question newly obtained by the corresponding virtual machine 120. In another related embodiment, the request does not include a copy of the object itself; rather, it includes a hash of the object in the virtual machine's file system or memory, which is in turn used by malware assessment module 162 to perform look-ups in a whitelist or blacklist. If the hash is not present in any such list, the full copy of the object can be requested by malware assessment module 162 though hypervisor 170, for heuristic analysis to be performed by malware assessment module 162.

Malware assessment module 162, upon completion of its analysis of the object in question, provides a return communication to the requesting lightweight agent module 130 via hypervisor module 170. This return communication can include a command to treat the malware (e.g., delete or quarantine the object) in case there is a detection, or suspicion, of malware associated with the object in question. In addition, the return communication can include a series of instructions for remediation of the effects of the operation of the malicious object. The remediation instructions are generated by malware remediation module 164.

In one embodiment, malware remediation module 164 includes a database of remediation instructions that are generated specifically in response to analyzed items of malware. For instance, the program code of each item of malware is de-constructed to reveal the operations effecting changes in the infected virtual machine. In turn, the remediation instructions are generated to un-do the effected changes by the malware. According to one embodiment, the remediation instructions are automatically generated under program control by the malware remediation module 164. In another embodiment, the remediation instructions are generated by an expert system that may be remote from the physical computing system, e.g., provided as a Web-based service. In another related embodiment, the remediation instructions are generated by a human analyst and looked up by malware remediation module 164 in response to the type of detected malware.

Oftentimes, for the effective remediation of the malware effects, certain advanced operations are needed. By its minimalist design, lightweight agent module 130 of the infected virtual machine 120 may lack the functional components needed to carry out the advanced operations. For instance, a piece of malware having been executed, may have encrypted a file following its infection, making it necessary to decrypt the file in order to remove the infection. Lightweight agent module 130 may lack the facilities (i.e., functional components) necessary to perform this operation. Similarly, the infected file may be a system-level driver or other object, e.g., a part of the operating system's library or registry residing within virtual machine 120.

Direct access to the objects of the operating system of virtual machine 120 is needed to install certain malware remediation tools, or to simply gain access to the infected system-level objects that were affected by operation of detected malware. However, the mutual isolation provided by the system virtualization implemented among virtual machines 110 and 120 prevents access by malware remediation module 164 to the system-level objects within virtual machines 120.

Accordingly, in one embodiment, central security module 160 further includes functionality update module 166, which is tasked with gathering, generating (in some cases), and providing, functional component updates for virtual machines 120. These operations are performed in response to an assessment of the capabilities of virtual machine 120 and its operating system and other components according to one embodiment.

To this end, in one embodiment, capability assessment module 168 includes program instructions and a knowledge base for determining the capability of each virtual machine 120 (i.e., the type and version of the operating system, the version and known feature set of lightweight agent 130, etc.). The capability can be represented in terms of available components for performing malware remediation. Capability assessment module 168 compares the available components against the components known (e.g., represented in a knowledge base) to be needed for carrying out the malware remediation instructions generated by module 164. Any deficiency of functional components is addressed by functionality update module 166. The functionality update is performed via specialized and secure inter-virtual machine communications facilitated by hypervisor 170.

In one embodiment, to facilitate the operation of capability assessment module 168, lightweight agent modules 130 each provide the operating system-related information, e.g., version number, identification of installed additional components, etc., as well as other available tools present on virtual machine 120, to capability assessment module 168, either as part of the service request, or in response to an inquiry from capability assessment module 168. In response, capability assessment module 168 looks up the functional components associated with the operating system-related information, and compares them to the functional components known to be needed for carrying out the specific remediation instructions. Any deficiency is addressed by a functional component update to be provided to lightweight agent module 130.

Figure 3:
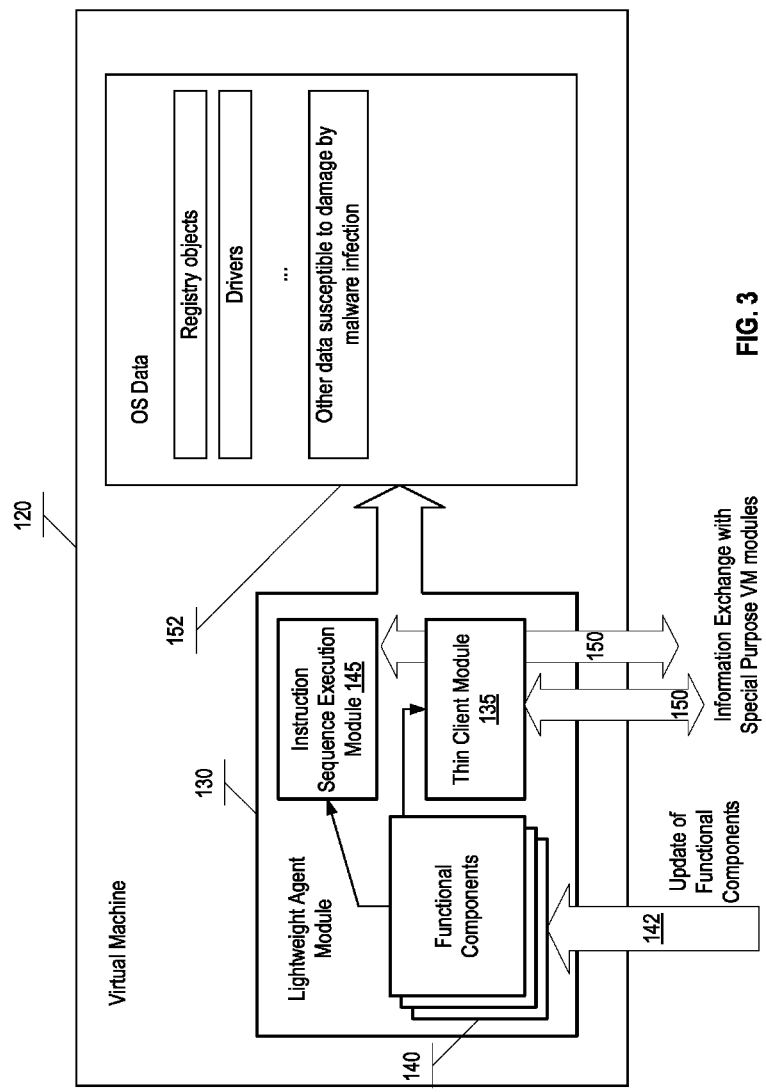
FIG. 3 is a block diagram illustrating a virtual machine that is served by the special-purpose virtual machine according to one embodiment.

FIG. 3 is a block diagram illustrating virtual machine 120 in greater detail. Lightweight agent module 130 includes thin client module 135 that interacts with special-purpose virtual machine 120 via hypervisor 170 to request security-related services in response to various events that call for malware screening, such as downloading of a file, as one example. Thin client module 135 can provide the object of interest to central security module 160, and receive treatment instructions, e.g., deletion or quarantining of the object in response to malware screening performed by central security module 160 indicating a presence or suspicion of malware. Thin client module 135 can, in one embodiment, perform the deletion/quarantining functions. Therefore, in this embodiment, thin client module 135 facilitates the transferring of the majority of the security information processing operations to central security module 160.

Functional components 140 include various libraries, drivers, utilities, and other tools that are essential to remediating the effects of malware. For instance, such tools can include a file system driver necessary for detecting rootkit malware, a driver for accessing the operating system's registry, a utility for breaking encryption applied by the operation of malware to a file, which must now be cleaned, or a driver for intercepting user input, which is usable for counteracting ransomware. Also, functional components 140 can include backup copies of certain system-level objects of the operating system. In some cases, proper remediation involves replacing a damaged or inaccessible file or other object, with the backup copy. In various embodiments, some, or all, of the functional components reside at the system level within the operating system of each virtual machine 120.

Instruction sequence execution module 145 receives remediation instructions from malware remediation module 164, and executes those instructions locally on virtual machine 120. In one embodiment, instruction sequence execution module 145 calls on the functional components 140 to effectively carry out the malware remediation. Functional components 140, residing at the system level, permit the instruction sequence execution module 145 to use, and modify, the protected operating system data 152 that is normally inaccessible to application-level processes. As exemplified in FIG. 3, operating system data 152 includes registry objects, drivers, and other data, all of which may be susceptible to damage caused by the operation of malware.

Also illustrated in FIG. 3 is an update 142 being made to functional components 140 by functionality update module 166. In a related embodiment, instruction sequence execution module 145 includes an installer module that is configured to install functional components 140 into the operating system of virtual machine 120.

Update 142 is facilitated by inter-virtual machine communication module 175 of hypervisor 170. Likewise, information 150 exchanged respectively by instruction sequence execution module 145 and thin client module 135, with malware remediation module 164, and malware and capability assessment modules 162 and 168, is depicted.

Figure 4A:
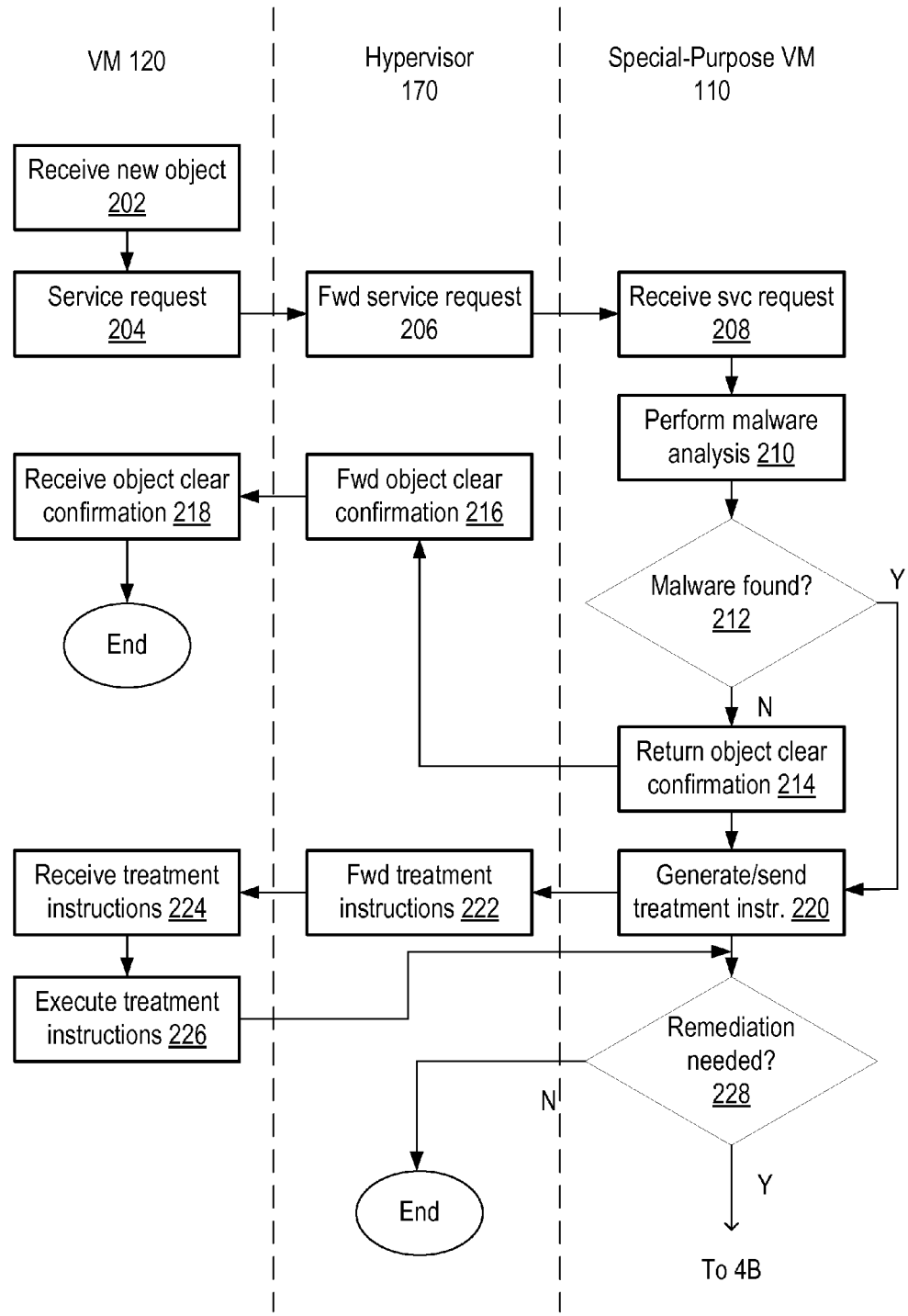
FIGS. 4A-4B are flow diagrams illustrating an exemplary process according to one embodiment for performing anti-malware operations in a computer system running multiple virtual machines.
Figure 4B:
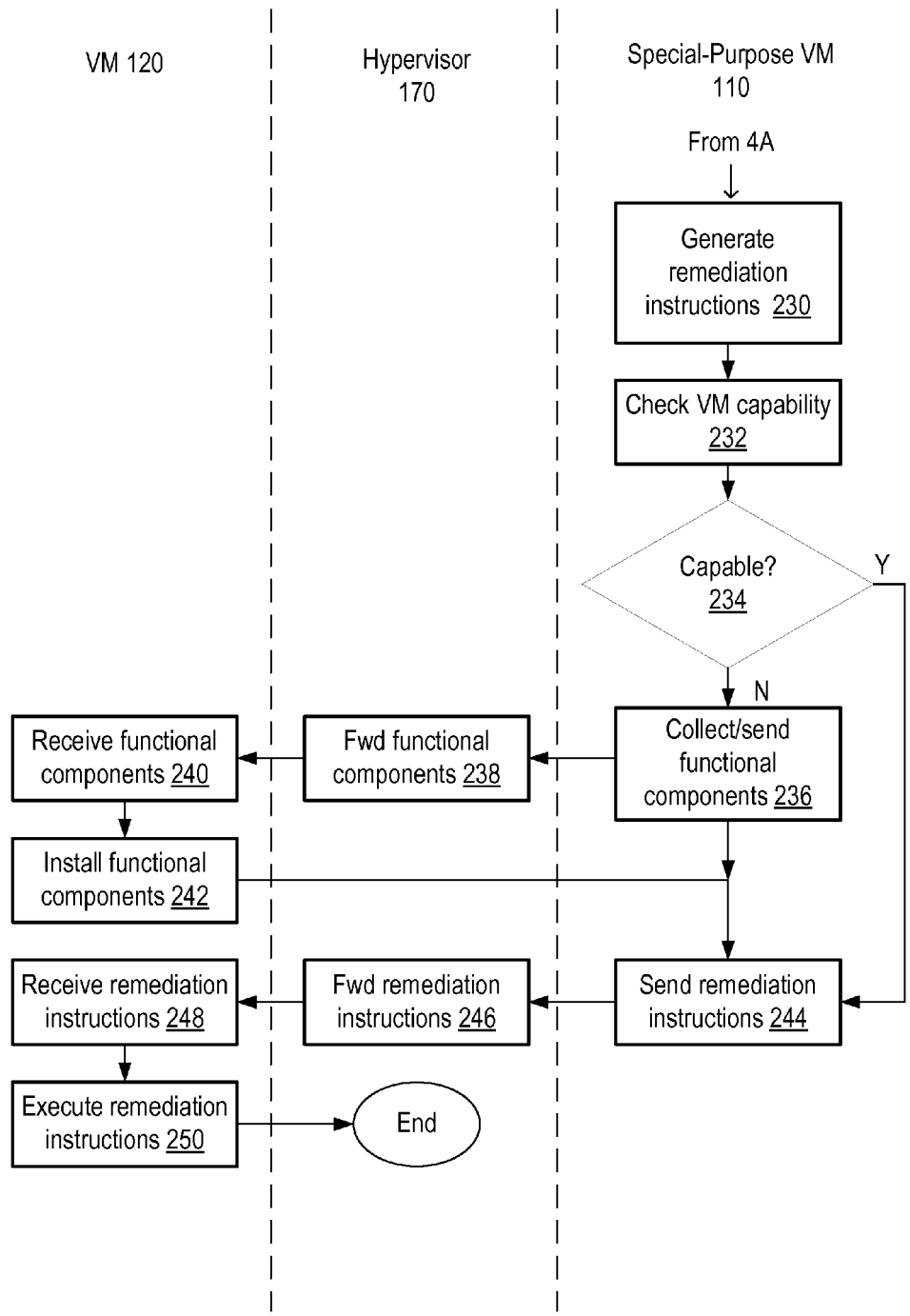

FIGS. 4A-4B are flow diagrams illustrating an exemplary process according to one embodiment for performing anti-malware operations in a computer system, such as server 100, for instance, in which multiple virtual machines are implemented. As depicted in these flow diagrams, operations taken by each of virtual machine 120, hypervisor 170, and special-purpose virtual machine 110, are organized into respective columns. Beginning with FIG. 4A, at block 202, virtual machine 120 recognizes an event that necessitates a malware analysis. As depicted, this event can be a receipt of a new object from an external source. At 204, in response to the event, the lightweight agent module of virtual machine 120 generates a service request for special-purpose virtual machine 110. Communication of the request is handled by hypervisor 170. Accordingly, at 206, hypervisor 170 forwards the service request, along with any accompanying data (such as, for instance, a copy of the newly-received object) to special-purpose virtual machine 110. At 208, special-purpose virtual machine 110 receives the service request.

In response to receiving the service request, at 210, special-purpose virtual machine 110 performs malware analysis. This can involve a number of different operations, some of which are discussed above. For instance, the object in question can be checked in whitelist/blacklist, malware signature analysis may be performed, heuristic analysis (e.g., emulation) may be performed to observe any suspicious behavior by the object as it is executed, etc. This operation produces a malware analysis result. At decision 220, if the result of the malware analysis indicates an absence of malware, special-purpose virtual machine 110 generates a confirmation that the object is clear at 214, and at 216 this confirmation is passed by hypervisor 170 to virtual machine 120, where it is received at 218. In this scenario, no further malware analysis-related action is needed.

If, on the other hand, decision 212 indicates that malware is present, the process branches to block 220, in which special-purpose virtual machine 110 generates and sends malware treatment instructions to virtual machine 120 to be locally executed on virtual machine 120 at the application level. Hypervisor 170 coordinates the communication of the treatment instructions at 222, such that the treatment instructions are received by virtual machine 120 at block 224. At block 226, the treatment instructions are executed by the lightweight agent module of virtual machine 120.

Meanwhile, at 228, special-purpose virtual machine 110 determines whether remediation of the effects of the detected malware is needed at virtual machine 120. This determination can be made based on previously-analyzed activity of the malware, the effects of which can be stored in a knowledge base accessible to special-purpose virtual machine 110. The knowledge base may be stored locally on virtual machine 110, or at a remote location, such as at a security service accessed by virtual machine 110. If no remediation is needed, the process is concluded. If remediation is determined to be needed, the process proceeds to the operations depicted in FIG. 4B.

Accordingly, at 230, in response to remediation being deemed necessary, remediation instructions are generated by special-purpose virtual machine 110. Generation of the remediation instructions can include obtaining the remediation instructions from a remote source, such as a security service accessible to special-purpose virtual machine 110; or locally generating the remediation instructions according to a knowledge base representing the effects of the operation of the detected item of malware.

At 232, special-purpose virtual machine 110 further evaluates the capability of virtual machine 120 to actually carry out the remediation instructions. As discussed above, various approaches are contemplated to determine this capability, and generally involve comparing the functional configuration of virtual machine 120 against the required functionality for performing the malware remediation. The determination of capability can be obtained at least in part by operations performed remotely, such as by a security service accessible to special-purpose virtual machine 110. If, at 234, virtual machine 120 is deemed capable to perform the remediation actions, the process branches to block 244, in which the remediation instructions are sent. The sending of the remediation instructions, like all communications between virtual machines according to this embodiment, is coordinated through hypervisor 170 that, at block 246, forwards the remediation instructions to virtual machine 120 which, in turn, receives the instructions at 248 prior to executing the remediation instructions at 250.

If, at 234, it is determined that virtual machine 120 is not capable of carrying out the malware remediation instructions, the process advances to block 236, at which special-purpose virtual machine 110 collects the necessary functional components that are lacking at virtual machine 120, and sends the same to be received by virtual machine 120. The functional components to be provided can, in one embodiment, be obtained from an external service accessible to special-purpose virtual machine 110. At 238, hypervisor 170 facilitates the communication of the functional component update to virtual machine 120, which receives the functional components at 240. At 242, virtual machine 120 installs the functional components into the operating system, as appropriate. Upon installation of the functional components, the remediation instructions can be carried out by virtual machine 120.

It should be noted that in the exemplary process of FIGS. 4A-4B, certain sequences of operations can be made in varying order. For instance, the remediation instructions can be sent to virtual machine 120 before the sending of necessary functional components. Persons of ordinary skill in the relevant arts will recognize these, and other, variations based on a reading of the principles described herein.

By virtue of these aspects of the present invention, among other benefits offered, system 100 can benefit from the use of a centralized special-purpose virtual machine tasked with carrying out security operations on behalf of multiple other virtual machines, while also benefitting from the ability to have the special-purpose virtual machine provide malware treatment and remediation instructions to be carried out by each supported virtual machine, even if any one of these virtual machines initially lacks the functional components needed to carry out such operations.

Figure 5:
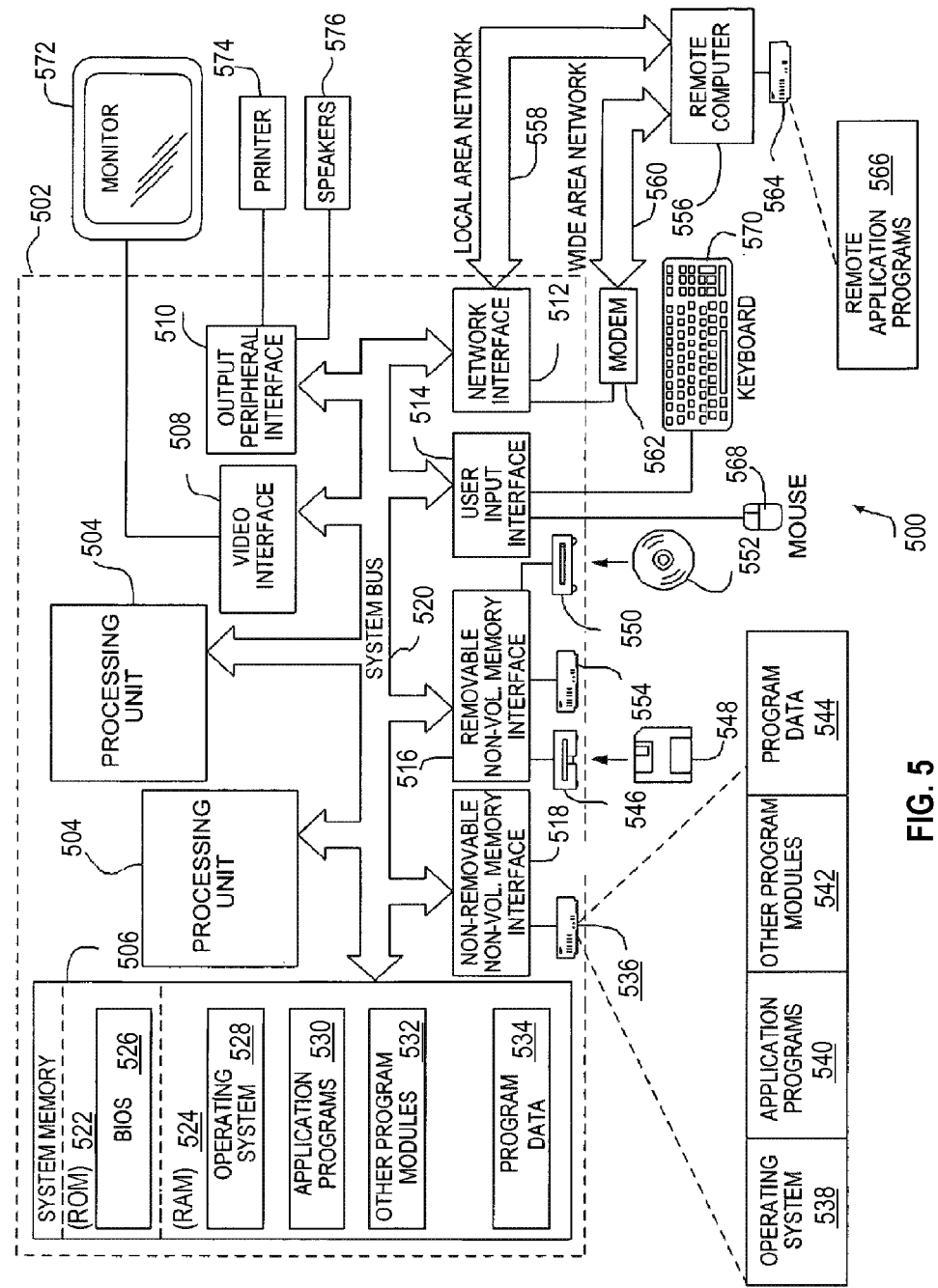
FIG. 5 is a block diagram of a general-purpose computer system on which aspects of the invention may be implemented according to some embodiments of the invention.

Turning now to FIG. 5, a computer system 500 is depicted on which aspects of the invention as described herein may be implemented according to various embodiments. The computer system 500 may include a computing device such as a personal computer 502. The personal computer 502 includes one or more processing units 504, a system memory 506, a video interface 508, an output peripheral interface 510, a network interface 512, a user input interface 514, removable 516 and non-removable 518 memory interfaces and a system bus or high-speed communications channel 520 coupling the various components. In various embodiments, the processing units 504 may have multiple logical cores that are able to process information stored on computer readable media such as the system memory 506 or memory attached to the removable 516 and non-removable 518 memory interfaces 518. The computer 502 system memory 506 may include non-volatile memory such as Read Only Memory (ROM) 522 or volatile memory such as Random Access Memory (RAM) 524. The ROM 522 may include a basic input/output system (BIOS) 526 to help communicate with the other portion of the computer 502. The RAM 524 may store portions of various software applications such as the operating system 528, application programs 530 and other program modules 532. Further, the RAM 524 may store other information such as program or application data 534. In various embodiments, the RAM 524 stores information that requires low-latencies and efficient access, such as programs and data being manipulated or operated on. In various embodiments RAM 524 comprises Double Data Rate (DDR) memory, Error Correcting memory (ECC) or other memory technologies with varying latencies and configurations such as RAMBUS or DDR2 and DDR3. In this way, in various embodiments, the system memory 506 may store the input data store, access credential data store, operating memory data store, instruction set data store, analysis result data store and the operating memory data store. Further, in various embodiments, the processing units 504 may be configured to execute instructions that limit access to the aforementioned data stores by requiring access credential before access to the information is granted.

The removable 516 and non-removable 518 memory interfaces may couple the computer 502 to disk drives 536 such as SSD or rotational disk drives. These disk drives 536 may provide further storage for various software applications such as the operating system 538, application programs 540 and other program modules 542. Further, the disk drives 536 may store other information such as program or application data 544. In various embodiments, the disk drives 536 store information that doesn't require the same low-latencies as in other storage mediums. Further, the operating system 538, application program 540 data, program modules 542 and program or application data 544 may be the same information as that stored in the RAM 524 in various embodiments mentioned above or it may be different data potentially derivative of the RAM 524 stored data.

Further, the removable non-volatile memory interface 516 may couple the computer 502 to magnetic portable disk drives 546 that utilize magnetic media such as the floppy disk 548, Iomega® Zip or Jazz, or optical disk drives 550 that utilize optical media 552 for storage of computer readable media such as Blu-Ray®, DVD-R/RW, CD-R/RW and other similar formats. Still other embodiments utilize SSD or rotational disks housed in portable enclosures to increase the capacity of removable memory.

The computer 502 may utilize the network interface 512 to communicate with one or more remote computers 556 over a local area network (LAN) 558 or a wide area network (WAN) 560. The network interface 512 may utilize a Network Interface Card (NIC) or other interface such as a modem 562 to enable communication. The modem 562 may enable communication over telephone lines, coaxial, fiber optic, powerline, or wirelessly. The remote computer 556 may contain a similar hardware and software configuration or may have a memory 564 that contains remote application programs 566 that may provide additional computer readable instructions to the computer 502. In various embodiments, the remote computer memory 564 can be utilized to store information such as identified file information that may be later downloaded to local system memory 506. Further, in various embodiments the remote computer 556 may be an application server, an administrative server, client computers, or a network appliance.

A user may enter information to the computer 502 using input devices connected to the user input interface 514 such as a mouse 568 and keyboard 570. Additionally, the input device may be a trackpad, fingerprint scanner, joystick, barcode scanner, media scanner or the like. The video interface 508 may provide visual information to a display such as a monitor 572. The video interface 508 may be an embedded interface or it may be a discrete interface. Further, the computer may utilize a plurality of video interfaces 508, network interfaces 512 and removable 516 and non-removable 518 interfaces in order to increase the flexibility in operation of the computer 502. Further, various embodiments utilize several monitors 572 and several video interfaces 508 to vary the performance and capabilities of the computer 502. Other computer interfaces may be included in computer 502 such as the output peripheral interface 510. This interface may be coupled to a printer 574 or speakers 576 or other peripherals to provide additional functionality to the computer 502.

Various alternative configurations and implementations of the computer 502 are within the spirit of the invention. These variations may include, without limitation, additional interfaces coupled to the system bus 520 such as universal serial bus (USB), printer port, game port, PCI bus, PCI Express or integrations of the various components described above into chipset components such as the northbridge or southbridge. For example, in various embodiments, the processing unit 504 may include an embedded memory controller (not shown) to enable more efficient transfer of data from the system memory 506 than the system bus 520 may provide.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A host machine for executing a plurality of virtual machines, the host machine comprising:
   computing hardware, including at least one processor, non-transitory data storage media interfaced with the at least one processor and comprising instructions that, when executed by the at least one processor, cause the computing hardware to implement:
   the plurality of virtual machines, each one of which provides an isolated execution environment wherein an operating system, a lightweight agent module, and user applications are executed;
   a special-purpose virtual machine that provides an isolated execution environment in which a central security module is executed;
   a hypervisor module that coordinates execution of the plurality of virtual machines and the special-purpose virtual machine, wherein information is communicated between each lightweight agent module of each corresponding virtual machine of the plurality of virtual machines and the central security module through the hypervisor module;
   wherein the central security module performs security-related tasks on behalf of individual ones of the plurality of virtual machines including malware assessment, and includes a malware remediation module configured to generate particularized malware remediation instructions that define actions to be executed by individual ones of the lightweight agent modules of corresponding ones of the plurality of virtual machines in response to an assessment of malware present in any of the virtual machines corresponding to those lightweight agent modules;
   wherein the lightweight agent module of each of the virtual machines includes an instruction sequence execution module configured to receive and execute the malware remediation instructions;
   wherein the central security module further includes:
      a capability assessment module configured to assess a capability of a first instruction sequence execution module of a first lightweight agent module corresponding to a first virtual machine of the plurality of virtual machines to effectively execute the malware remediation instructions; and
      a security functionality update module configured to provide an advanced security task execution component to be installed in the first virtual machine, in response to an assessment of capability of the first lightweight agent module being insufficient to execute the malware remediation instructions.

2. The host machine of claim 1, wherein the central security module is configured to generate malware treatment instructions that, when executed by the first lightweight agent module, cause the first lightweight agent module to remove a detected malware object.

3. The host machine of claim 1, wherein the central security module is configured to generate malware treatment instructions that, when executed by the first lightweight agent module, cause the first lightweight agent module to quarantine a detected malware object.

4. The host machine of claim 1, wherein the central security module performs the security-related tasks in response to a security service request by any lightweight agent module of one or more of the plurality of virtual machines.

5. The host machine of claim 1, wherein the advanced security task execution component includes a system-level functional component, and wherein the malware remediation instructions consist of application-level instructions.

6. The host machine of claim 1, wherein the advanced security task execution component includes an operating system driver update.

7. The host machine of claim 1, wherein the advanced security task execution component includes an operating system registry update.

8. The host machine of claim 1, wherein the advanced security task execution component includes an item of backed-up data.

9. The host machine of claim 1, wherein the advanced security task execution component includes a data processing tool.

10. The host machine of claim 1, wherein the instruction sequence execution module includes an installer module that is configured to install the advanced security task execution component into the operating system.

11. A computer-implemented method for performing anti-malware operations in a computer system in which multiple virtual machines are executed, the method comprising:
    executing, by the computer system, a first plurality of virtual machines from among the multiple virtual machines, each one of the first plurality of virtual machines providing an isolated execution environment wherein an operating system, a lightweight agent module, and user applications are executed;
    executing, by the computer system, a special-purpose virtual machine from among the multiple virtual machines, that provides an isolated execution environment in which a central security module is executed;
    executing, by the computer system, a hypervisor module that coordinates execution of the first plurality of virtual machines and the special-purpose virtual machine, and that coordinates communications between each lightweight agent module of each corresponding virtual machine of the first plurality of virtual machines and the central security module;
    wherein in executing the special-purpose virtual machine, the central security module performs security-related tasks on behalf of individual ones of the first plurality of virtual machines including malware assessment, and further generates particularized malware remediation instructions that define actions to be executed by individual ones of the lightweight agent modules of corresponding ones of the first plurality of virtual machines in response to an assessment of malware present in any of the first plurality of virtual machines corresponding to those lightweight agent modules; and
        wherein the central security module further assesses a capability of a first instruction sequence execution module of a first lightweight agent module corresponding to a first virtual machine of the first plurality of virtual machines to effectively execute the malware remediation instructions; and
        in response to an assessment of capability of the first lightweight agent module being insufficient to execute the malware remediation instructions, the central security module further provides an advanced security task execution component to be installed in the first virtual machine; and
    wherein in executing the first lightweight agent module, the malware remediation instructions are received, and in response to receiving the advanced security task execution component, the first lightweight agent module installs the advanced security task execution component prior to executing the malware remediation instructions.

12. The method of claim 11, wherein in executing the first lightweight agent module, malware treatment instructions are received from the central security module and executed by the first lightweight agent module to remove a detected malware object.

13. The method of claim 11, wherein in executing the first lightweight agent module, malware treatment instructions are received from the central security module and executed by the first lightweight agent module to quarantine a detected malware object.

14. The method of claim 11, wherein in executing the first lightweight agent module, the first lightweight agent module provides a security service request to be received by the central security module and, in response to receiving the security service request, the central security module initiates a first one of the security-related tasks.

15. The method of claim 11, wherein first lightweight agent module installs the advanced security task execution component as a system-level object.

16. The method of claim 11, wherein the advanced security task execution component includes an operating system driver update.

17. The method of claim 11, wherein the advanced security task execution component includes an operating system registry update.

18. The method of claim 11, wherein the advanced security task execution component includes an item of backed-up data.

19. The method of claim 11, wherein the advanced security task execution component includes a data processing tool.

20. A host machine for performing anti-malware operations among multiple virtual machines executing thereupon, the host machine comprising:
    means for executing a first plurality of virtual machines from among the multiple virtual machines, each one of the first plurality of virtual machines providing an isolated execution environment wherein an operating system, a lightweight agent module, and user applications are executed;
    means for executing a special-purpose virtual machine from among the multiple virtual machines, that provides an isolated execution environment in which a central security module is executed;
    means for coordinating execution of the first plurality of virtual machines and the special-purpose virtual machine, and for coordinating communications between each lightweight agent module of each corresponding virtual machine of the first plurality of virtual machines and the central security module;
    wherein in the means for executing the special-purpose virtual machine, the central security module performs security-related tasks on behalf of individual ones of the first plurality of virtual machines including malware assessment, and further generates particularized malware remediation instructions that define actions to be executed by individual ones of the lightweight agent modules of corresponding ones of the first plurality of virtual machines in response to an assessment of malware present in any of the first plurality of virtual machines corresponding to those lightweight agent modules; and
        wherein the central security module further assesses a capability of a first instruction sequence execution module of a first lightweight agent module corresponding to a first virtual machine of the first plurality of virtual machines to effectively execute the malware remediation instructions; and
        in response to an assessment of capability of the first lightweight agent module being insufficient to execute the malware remediation instructions, the central security module further provides an advanced security task execution component to be installed in the first virtual machine; and wherein in the means for executing the first lightweight agent module, the malware remediation instructions are received, and in response to receiving the advanced security task execution component, the first lightweight agent module installs the advanced security task execution component prior to executing the malware remediation instructions.

\* \* \* \* \*